United States Patent [19]

Collica

[11] Patent Number: 4,568,828

[45] Date of Patent: Feb. 4, 1986

[54] RAPID DETERMINATION OF LINEARITY IN A DOSE CALIBRATOR

[75] Inventor: Carl J. Collica, New Rochelle, N.Y.

[73] Assignee: William H. Miller, Fairview Park, Ohio

[21] Appl. No.: 255,384

[22] Filed: Apr. 20, 1981

[51] Int. Cl.[4] ........................................... G01D 18/00
[52] U.S. Cl. ................................ 250/252.1; 250/505.1; 378/157
[58] Field of Search ........... 250/252.1, 505.1, 432 PD; 378/57, 207, 56, 157, 158

[56] References Cited

U.S. PATENT DOCUMENTS

| | | | |
|---|---|---|---|
| 3,524,063 | 8/1970 | Mangan | 250/359.1 |
| 3,657,541 | 4/1972 | Deutsch et al. | 250/252.1 |
| 4,333,010 | 6/1982 | Miller | 250/505.1 |
| 4,352,020 | 9/1982 | Horiba et al. | 378/207 |

Primary Examiner—Alfred E. Smith
Assistant Examiner—Carolyn E. Fields
Attorney, Agent, or Firm—Watts, Hoffmann, Fisher & Heinke Co.

[57] ABSTRACT

A method of testing dose calibrator linearity comprising the steps of serially interposing a plurality of shields between the sample and detector, each shield having a given thickness to absorb a desired fraction of the radiation; measuring the activity of the sample as attenuated by the shields; calculating the actual activity of the sample at each level of attenuation; and comparing the measured activities with the calculated activities. For carrying out the method several embodiments of shields are described.

3 Claims, 2 Drawing Figures

4,568,828

RAPID DETERMINATION OF LINEARITY IN A DOSE CALIBRATOR

FIELD OF THE INVENTION

The present invention relates to a method and to means for utilization of said method in the test for linearity of a dose calibrator. The linearity test disclosed herein is time independent, and may be conducted in minutes as opposed to prior art procedures which span at least 24 hours, and oftentimes more than 48 hours.

BACKGROUND OF INVENTION

Radioactive materials are in widespread use in the treatment of cancer, and are also employed in photography, as tracer materials in the chemical industry and in the structural analysis of welded members. Particularly in the field of radiopharmaceuticals, a radionuclide or radioisotope must be assayed before the patient is provided with treatment. The instrument used to measure the strength or activity of the radiopharmaceutical is a dose calibrator.

The dose calibrator must be checked for accuracy prior to initial use, after each repair and periodically thereafter. The applicable tests for calibration of the dose calibrator are described in U.S. Nuclear Regulatory Guide 10.8, Appendix D, Section 2, PP. 10.8–27 to 29 (Rev. 1, October 1980). One such test is that for linearity. That is, the dose calibrator must perform accurately to within ±10% over the entire range of radionuclide activity contemplated during the use of the instrument. In most instances this range will be from about 500 millicuries to about 0.1 millicurie (100 microcuries), but may include activities up to 2 curies or as low as 1 microcurie.

The procedure in current use measures the initial activity of a test sample, and allows the sample to decay until the activity has decreased to the low end of the anticipated range of use, several measurements being taken through the period. Knowing the decay constant and initial activity, the actual activities of the decaying sample at various time increments may be calculated. Actual activities are then compared to measured quantities, linearity being confirmed by error deviations of less than ±10% for each comparison. If the initial activity is unkown, the procedure is the same except that one of the intermediate measurements is selected as a base point. Alternatively, one may calculate and compare time at incremental activities. Because the half life of technetium —99m (Tc-99m), the isotope most often used in linearity determinations, is 6.04 hours, a complete test from 500 to 0.1 millicurie takes about 74 hours. Obviously, this time consuming procedure is inconvenient at best, and may seriously delay appropriate patient treatment.

SUMMARY OF INVENTION

It is an object of this invention to provide a method for rapidly determining linearity of a dose calibrator.

A further object is to provide a rapid method of dose calibrator linearization which is suitable for radioisotopes having relatively long half lives.

Another object of this invention is to provide a plurality of shields adaptable for use with a dose calibrator to effect a linearity determination thereof rapidly.

These and other objects and advantages of the invention will be more fully understood upon a reading of the detailed description, a summary of which follows.

A plurality of shields of known material are serially interposed between the radioactive sample (in its nonmetallic container) and the detector, and the radiation as attenuated by the shields is measured. The number of such measurements thus made depends upon the width of the range of activities over which the dose calibrator is to operate during use. Each shield is characterized by being of a discrete thickness, which thickness is adapted to absorb a known fraction of the radiation emanating from the source sample. Knowing the amount of radiation absorbed by the shields, it is possible to calculate the activity value which should have been perceived by the calibrator. By comparing the measured to the calculated activities, confirmation of linearity of the calibrator can be obtained, an error deviation of less than a given standard for each comparison being required for acceptance of the unit.

The shields are in the form of disks with a projecting lip, the lip receiving the sample container. In another embodiment, each shield is a cylindrical sheath whose bottom is of the desired thickness. Typically, the thickness of the shield will be accurate to within +0.5%.

DETAILED DESCRIPTION OF INVENTION

Figure 1:
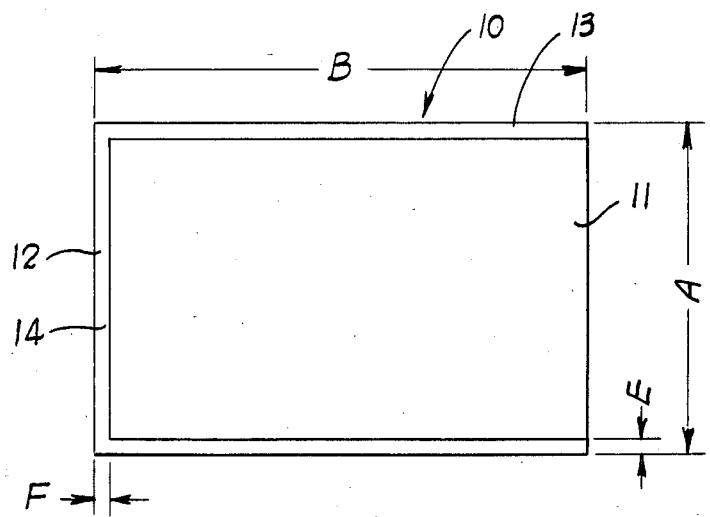
FIG. 1 is a front elevation in full section of a typical embodiment of the invention.

For a more complete appreciation, attention is invited to FIG. 1 which shows a hollow cylindrical sheath 10 of lead or other suitable radiation attenuating material that is open at one transverse end 11. The sheath 10, moreover, has dimensions that are suitable to receive a radioactive sample, or source (not shown in the drawing), for instrument calibration purposes.

In accordance with a feature of the invention, wall thicknesses 12, 13 of the bottom section, or transverse closed end 12 of the sheath 10 and the longitudinal wall 13 are of predetermined thickness 14, as described subsequently in more complete detail.

Figure 2:
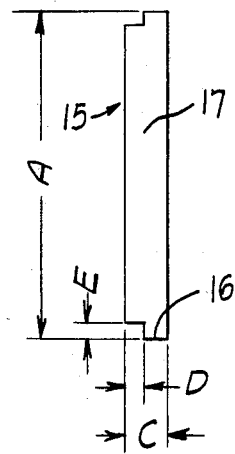
FIG. 2 is a front elevation in full section of another embodiment of the invention.

Turning now to FIG. 2 a lead or other suitable radiation attenuating shield in the form of a disk 15 is illustrated. The disk 15 has a projecting lip 16 with dimensions that are suitable to fit across one end of a radioactive sample container (not shown in the drawing). Further in this respect, predetermined thickness 17 of the disk 15 is established in the manner subsequently described.

The linearity test disclosed herein is convenient for use with all dose calibrators, particularly for use with dose calibrators of the ionization type. Typical ionization type units are the commercially available RAD/-CAL ™ II unit (TM Victoreen, Inc.); the MEDIAC ® dose calibrator Model No. 6362 (Nuclear-Chicago Corporation); and the CRC-16 and CRC-30 radioisotope calibrators (Capintec, Inc.).

Linearity may be defined as accuracy of the dose calibrator over a wide range of radioisotope activity. A plot of the natural log of activity versus decay time for a given isotope would, for a linearly accurate calibrator, provide a straight line according to the equation:

$$A = A_0 e^{-\lambda t} \quad (1)$$

where

A = activity at time t $A_o$ = initial activity at time t=0

λ = decay constant, and t = time.

A check for linearity is necessary because the same instrument may be used to assay samples having a wide range of activities. Thus, in nuclear medicine, one instrument may measure samples with an activity as high as 2 curies or possibly as low as 1 microcurie. Generally, however, the range of activities normally encountered falls between approximately 500 to approximately 0.1 millicuries. The U.S. Nuclear Regulatory Commission Guide 10.8 (Rev. 1, October 1980) states at page 10.8-6 that all radiopharmaceuticals should be assayed to an accuracy of ±10% of the true value prior to administration to patients. Many hospitals have stricter internal standards adopted for safety of the patients.

A range of activities is obtained under linearity test procedures of the prior art by allowing a sample of a short-lived isotope, usually Tc-99m to decay over time, measurements being taken and compared to activities calculated by equation (1). To linearize a calibrator over the range from 500 to 0.1 millicuries takes about 74 hours; from 2 curies to 1 microcurie, about 126 hours.

To eliminate the time element, the present method repetitively measures the activity of the sample with shields of known materials and thickness, each shield being interposed serially between the sample (in its non-metallic container) and the detector or counter. Each shield thus interposed absorbs a discrete fraction of the radiation emanating from the source according to the equation:

$$I = I_o e^{-\mu_l x} \quad (2)$$

where $I_o$ = initial intensity without shield

I = intensity with shield thickness = x $\mu_l$ = linear attenutation coefficient of the shield material, and x = shield thickness.

Thus, a plurality of shields may be provided which absorb pre-determined amounts of radiation. For example, with Tc-99m as the source, $\mu_l$ for lead is 3.465 $mm^{-1}$, and a lead shield of 1.129 mm thickness would by necessity absorb 98% of all radiation emanating from said source. That is, only 2% of the radiation would be measured by the detector. To obtain the corresponding decay of the Tc-99m sample such that the initial activity decreased by 98%, the technician, physicist or radiologist calibrating the instrument by the prior art procedure would have to wait about 34 hours. However, with the shield in place the value perceived by the instrument could be compared immediately to the value for a 98% reduction.

To fully linearize the instrument over the range, it would be necessary to have at least several shields of known thickness, each shield being serially interposed to provide a new reading at a different level of perceived radiation. The number of measurements to be made would of course depend on the width of the range and accuracy desired. Typically, four to six measurements would be sufficient. Reproduced in tabular form below are the thicknesses of lead shields necessary for achieving a required level of radiation as measured by the detector, and the activity thus measured from a 2 curie and a 500 millicurie Tc-99m source.

| % Radiation Reaching Detector | Thickness (mm) | Radiation Reaching Detector (mCi) | |
|---|---|---|---|
| | | (2 Ci. Source) | (500 m. Ci. Source) |
| 100 | 0 | 2000 | 500 |
| 75 | 0.083 | 1500 | 375 |
| 50 | 0.200 | 1000 | 250 |
| 20 | 0.464 | 400 | 100 |
| 10 | 0.664 | 200 | 50 |
| 1 | 1.329 | 20 | 5 |
| 0.1 | 1.994 | 2 | 0.5 |
| 0.01 | 2.696 | 0.2 | 0.05 |
| 0.001 | 3.323 | 0.02 | 0.005 |
| 0.00005 | 4.187 | 0.001 | 0.00025 |

Not all of these shields are necessary for each check of linearity, but a complete set would suffice for most applications. In certain instances where great accuracy is desired or a very wide range is encountered, additional shields can be used. In addition, several of the finer shields may possibly be concatenated to produce the effect of a thicker shield. Finally, different materials having lower linear attenuation coefficients may be employed to obtain thicker shields having greater durability, but of equivalent attenuation. Shield thickness should be such that the level of accuracy in the performance of the procedure is commensurate with accuracy requirements of the user. When the dose calibrator is used to assay radiopharmaceuticals a thickness accuracy of −0.0 to ±0.5% is believed necessary to insure proper calibration. Other materials suitable for use as shields are selected from the ferrous and non-ferrous metals, including aluminum, iron, tin, cadmium, and each of their alloys. Non-metallic materials, for example, plastic materials such as Lexan TM nylon, and the like, could also be used, but would result in shields of extreme thickness. Use of metallic and non-metallic materials having low linear attenuation coefficients may be advantageous, however, where only a small fraction of the radiation is to be attenuated. The thicker shield would be easier to work with, and less subject to breakage.

The shields may be in the form of disks 15 (FIG. 2) adapted for insertion between the sample container and detector. Most conveniently, however, the disk type shield will be provided with a lip 16 about its periphery, the lip receiving the container. In this way there will be no errant radiation entering the detection zone. In another embodiment the shields are cylindrical sheaths 10 (FIG. 1), the sample container being received thereinto. In each embodiment, the bottom section 12 of the shield, e.g., the portion interposed between the sample container and detector, would be of proper thickness as indicated from the above discussions. In another embodiment, particularly with respect to the finer shields, the base of the shield would comprise a relatively thick, highly absorbent exterior annular portion and an interior circular portion of proper thickness. The annular portion provides the requisite strength for the shield, and absorbs essentially all of the radiation incident to its surface. The circular portion allows that fraction of the radiation associated with the shield to pass through and be detected.

Because the procedure described herein is not dependent on time, and, indeed may be performed in 10 to 20 minutes, it is suitable for use with a wide variety of isotopes, including those of long half lives, for example, sodium-24 (14.97 hours), iron-59 (45.1 days), iodine-131 (8.08 days), xenon-133 (5.27 days), cobalt-57 (270days), and cobalt-60 (5.24 years).

Tabulated below is a hypothetical example illustrative of the present method. The table is predicted on the use of a Tc-99m sample having an initial activity of 250 mCi.

| Shield Thickness (mm) | % Radiation Measured | Equivalent Time (hrs) | Activity Measured (mCi) | Activity Calculated (mCi) | % Deviation |
|---|---|---|---|---|---|
| 0 | 100 | 0 | 250 | — | — |
| 0.083 | 75 | 2.5 | 192 | 187.5 | 2.4 |
| 0.200 | 50 | 6.0 | 127 | 125 | 3.2 |
| 0.464 | 20 | 13.9 | 56 | 50 | 12.0 |
| 0.644 | 2.0 | 19.9 | 5.32 | 5.0 | 6.4 |
| 1.329 | 1.0 | 39.9 | 2.55 | 2.5 | 2.0 |

The calculated activity in the table is merely the "% radiation measured" times the initial sample activity inasmuch as the shields have been fabricated to a pre-set thickness which defines the actual fraction of radiation perceived by the detector. Because the activity measured at 80% attenuation (20% passing through shield) is in error by more than 10%, the dose calibrator would not pass the linearity test under the Nuclear Regulatory Commission standards. Note that time is not a factor in the above example.

The above disclosure is intended to be exemplary of the invention and is not to be construed to be limited except as provided in the appended claims. For example it is readily seen that the shields may be fabricated for use with a particular radioisotope, the shield thickness being such as to provide attenuation corresponding to equivalent decay time. Thus, in the example, shields could have been provided to mirror the activity after 5, 10, 20 and 40 hours of decay when used with a particular radioisotope.

I claim:

1. A test method for evaluating response of a dose calibrator for measuring the amount of radiation produced by a radioactive source subject to decay, said method comprising the steps of:
    (a) disposing the source for continuous measurement by the dose calibrator during the test;
    (b) simulating different amounts of source decay by successively differingly and incompletely shielding the source during a single test;
    (c) monitoring the response of the dose calibrator to the shielded source at each of the differing shieldings, and
    (d) comparing said monitored responses.

2. A test process of evaluating uniformity over time of response linearity of a radioisotope dose calibrator, said process comprising the steps of:
    (a) testing the dose calibrator to assure that its degree of linearity of response is initially within a predetermined standard;
    (b) placing a quantity of isotope in the dose calibrator for measurement;
    (c) shielding the radioisotope in a succession of different and incomplete degrees during a single test procedure;
    (d) measuring and recording the response of the dose calibrator during each of said successive shielding steps;
    (e) later repeating steps (c) and (d), and
    (f) comparing the two steps of measurements derived from the performance of steps (d) and (e).

3. A test method for evaluating the response linearity of a radiopharmaceutical dose calibrator, said method comprising the steps of:
    (a) placing a reference dose in the calibrator;
    (b) successively shielding the reference dose to different known and incomplete degrees during a single test procedure;
    (c) recording a calibrator measurement reading for each degree of shielding;
    (d) multiplying each reading by a factor which is a function of the degree of shielding corresponding to that reading, and
    (e) comparing the resulting products.

* * * * *